C. ELSASSER.
COMBINED CARPET BEATER AND SWEEPER.
No. 186,550. Patented Jan. 23, 1877.
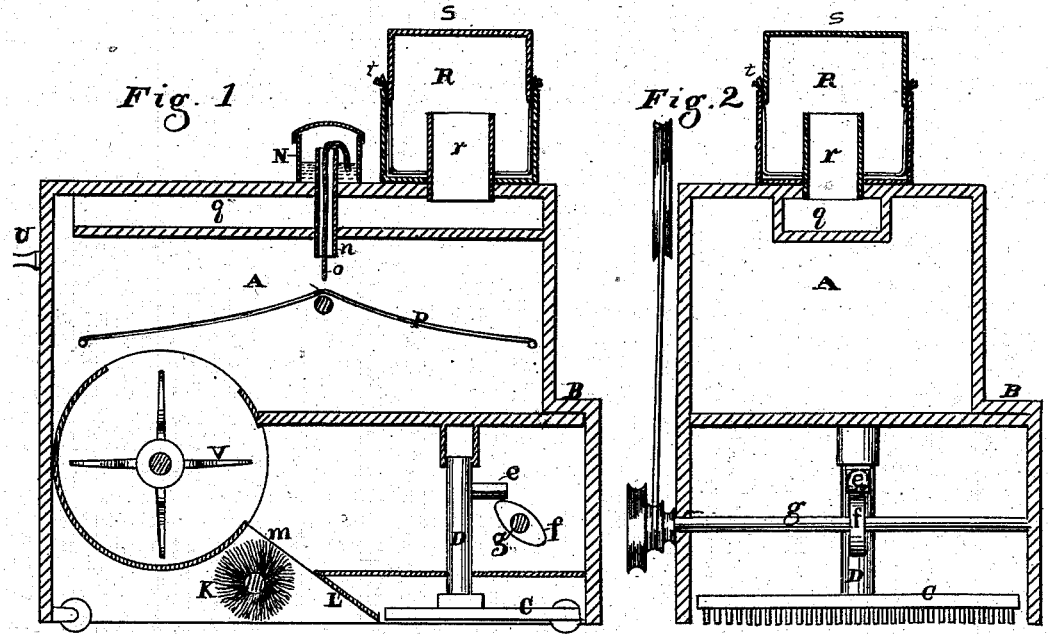
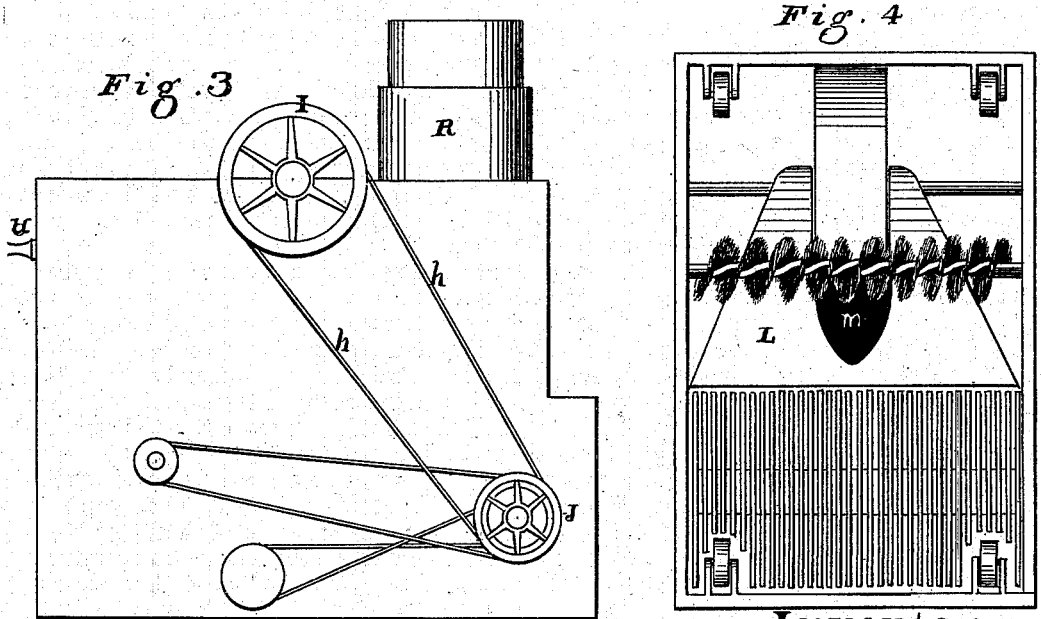
Witnesses
Geo. H. Strong
Owyn T. Stacy
Inventor
Chas. Elsasser
By his att'ys
Dewey & Co.

UNITED STATES PATENT OFFICE.

CHARLES ELSASSER, OF SAN FRANCISCO, CALIFORNIA.

IMPROVEMENT IN COMBINED CARPET BEATERS AND SWEEPERS.

Specification forming part of Letters Patent No. 186,550, dated January 23, 1877; application filed December 2, 1876.

*To all whom it may concern:*

Be it known that I, CHARLES ELSASSER, of the city and county of San Francisco and State of California, have invented an Improved Carpet-Beating Machine; and I do hereby declare the following to be a full, clear, and exact description thereof, reference being had to the accompanying drawings.

My invention relates to certain improvements upon the carpet-beating machine for which Letters Patent were issued to me on the 1st day of February, 1876.

My improvements are described in the following specification, in which reference is made to the accompanying drawings, in which—

Figure 1 is a longitudinal vertical section. Fig. 2 is a transverse vertical section. Fig. 3 is a side view, and Fig. 4 is a bottom view.

This machine is used to clean carpets when laid down on the floor.

The box or case A, inside of which the mechanism is inclosed, and inside of which the dust is caught and retained, I now make so that the lower part of the box will project on one side and one end, as represented, so that I can work close up against the wall or base-board of a room, where a molding projects from the bottom of a window into a room so as to interfere with a square box or case. This necessitates the making of the upper part of the box or case smaller than the lower part, and the placing of the smaller or upper part to one side of the top of the lower part, thus forming a ledge or projection, B, at one side and one end of the middle of the box.

The upper or smaller portion of the box I then use as a dust box or chamber, while the lower part contains the beater, fan, and a rotary brush, the latter of which I have added to the combination of cleaning devices.

C is the beater, which may be made of bars, whips, levers, or of any other suitable and ordinary beating and whipping device. I usually, however, use the series of parallel bars described in my former patent. This beater is secured to the lower end of an upright shaft, D, on which there is a projection, *e*. A tappet, *f*, on the transverse shaft *g* strikes this projection and raises and lowers the beaters.

In my former machine this shaft *g* was driven by a wheel inside of the box or case, which was rotated by the friction of moving the box over the floor. This I have altered; and I now drive this shaft by a belt, *h*, which passes around a crank-pulley, I, near the upper part of the machine, and outside of it, and around a pulley, J, on the end of the shaft. The crank-pulley I, I rotate by hand-power, so that I obtain a more positive action.

The projection *e*, if made of metal only, soon wears away; I therefore make a semi-tubular sheet-metal shell projection and plug it with wood, so that the cam will strike the wood. When the wood wears away so as to expose the shell, the wood can be removed and a fresh plug inserted.

A short distance behind the beater I mount a cylindrical brush, K, and drive it by a belt-connection with the shaft *g*. I also secure a shield or partition, L, at an angle between the beater and the top of the brush, and in this shield I make an opening, *m*, so that the dust which passes into the box between the beater-bars will not pass downward between the brush and the beater, while the brush sweeps the carpet behind the beater, and forces the dust through the opening *m*, above the shield or partition, where it will be caught by the fan or suction and forced into the dust-chamber.

In the upper or dust chamber I place a tent or hood, P, of woolen cloth or other absorbent material, over the mouth or opening, through which the dust is forced by the fan V into the chamber; and directly above this tent or hood I secure, on the top of the cover of the box, a vessel, N, through the bottom of which a pipe or tube, *n*, passes and extends through the cover or top down into the chamber, and also extends upward in the vessel to near its top. This vessel I keep partially filled with water all the time. I also draw a wick, O, through the tube, so that one end will extend into the chamber above the hood P, while its opposite end reaches the water in the vessel N. The wick will then convey a constant supply of water from the vessel N down through the tube and drop it upon the hood, so as to keep it wet or saturated with water. The dust will therefore be moistened by coming in contact with the surfaces of the hood, and thus be prevented from being carried by the current of wind out of the box. The air, however, which is forced with the dust into this dust-chamber must escape; otherwise a pressure would be created in the chamber, and this escaping air will have a tendency to carry with it a quantity of floating dust, and thus liberate it in the room again. To avoid these difficulties I make a long passage, $q$, on the under side of the cover or top of the box, which opens at one end into the chamber, while its opposite end connects with a dust-collector, R, which is attached to the top of the cover. This dust-collector consists of a vessel or box, which is lined inside with an absorbent material. A tube, $r$, rises upward in the center of the vessel to near its top, through which the air and dust enter the vessel. A cover, S, which is also lined inside with an absorbent material, is fitted loosely upon the vessel, so as to permit the air to escape between the edges of the vessel and cover. A fringe, $t$, which is made of absorbent material, covers this open joint, as represented. The lining of the box and cover and the fringe $t$ I keep constantly saturated with water, so that the dust will be collected upon them, while the air escapes free. The fringe and lining must be cleaned as often as they become overlaid with dust. U is a short handle, which is secured to the box, and by which it is handled.

I thus greatly improve this class of carpet beating and cleaning machines.

Having thus described my invention, what I claim as new, and desire to secure by Letters Patent, is—

1. A carpet beating and cleaning machine, having the beaters C, rotary brush K, shield or partition L, with its opening $m$, incased suction-fan V, and dust-chamber, all inclosed in a box or case, and operated by hand-power applied to the crank-wheel $i$, substantially as above specified.

2. The tent or hood P over the blast-opening, in combination with the dripping device, consisting of the water-vessel N, with its pipe $n$ and wick O, substantially as and for the purpose described.

3. The box A, having the air-escape passage $q$, arranged to connect at one end with the dust-chamber, and at the opposite end with a collecting-vessel, R, which is lined with an absorbent material, said vessel having a loosely-fitting cover, S, through which the air escapes, and which is covered by a pendent fringe of absorbent material, substantially as and for the purpose described.

In witness whereof I have hereunto set my hand and seal.

CHARLES ELSASSER. [L. S.]

Witnesses:
JOHN L. BOONE,
GEO. H. STRONG.